A. E. HAUCK, DEC'D.
A. H. STEIN, EXECUTOR.
SUCTION TORCH.
APPLICATION FILED MAY 4, 1920.

1,398,553.

Patented Nov. 29, 1921.
2 SHEETS—SHEET 1.

Inventor
Arthur E. Hauck
By his Attorney
O. Mary Edwards

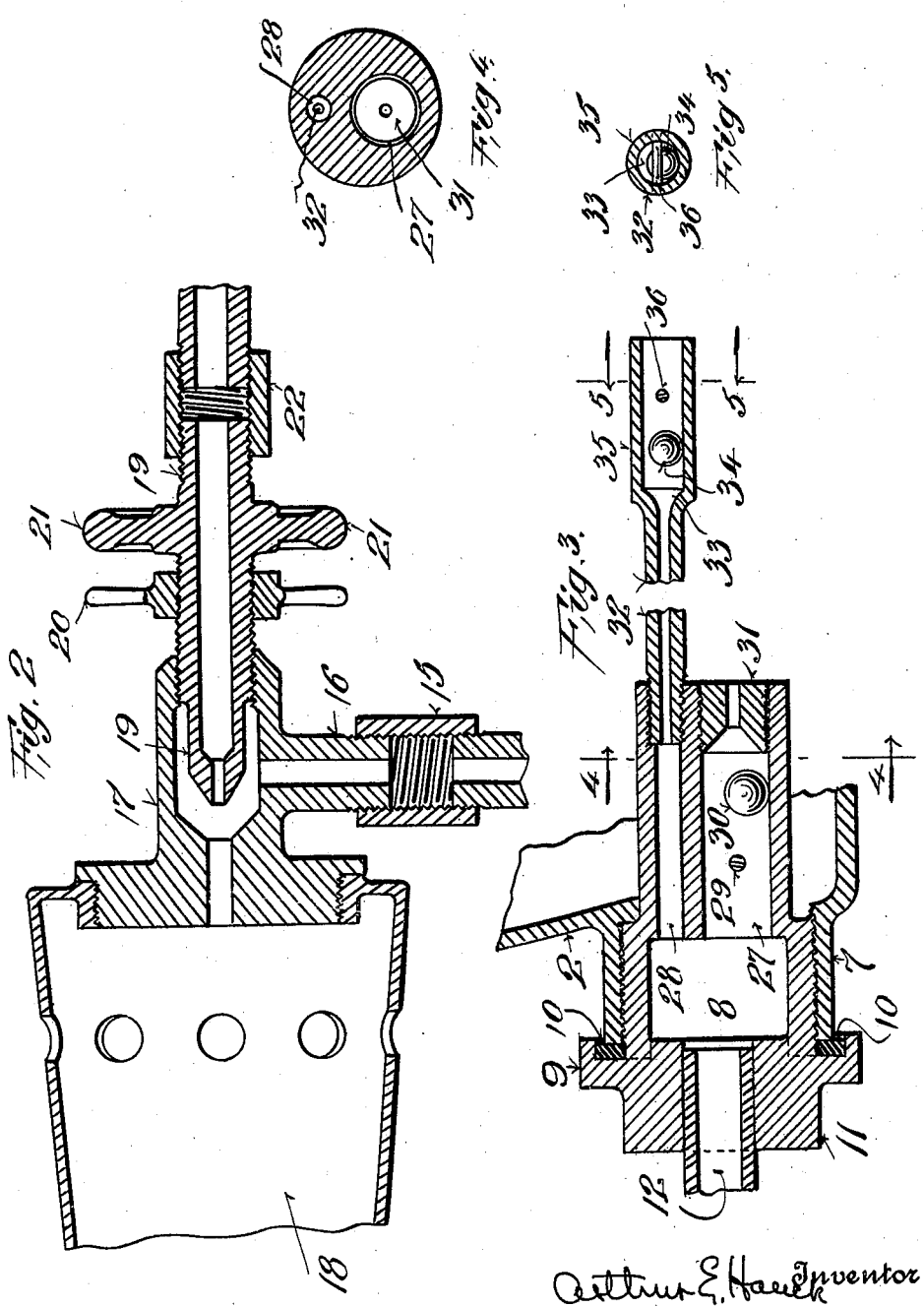

UNITED STATES PATENT OFFICE.

ARTHUR E. HAUCK, OF NEW YORK, N. Y.; ADOLPH H. STEIN EXECUTOR OF SAID ARTHUR E. HAUCK, DECEASED.

SUCTION-TORCH.

1,398,553.  Specification of Letters Patent.  Patented Nov. 29, 1921.

Application filed May 4, 1920. Serial No. 378,729.

*To all whom it may concern:*

Be it known that I, ARTHUR E. HAUCK, a citizen of the United States, and a resident of the city of New York, county of Kings, and State of New York, have invented a new and useful Improvement in Suction-Torches, of which the following is a specification.

The object of my invention is to provide a suction torch which will operate in a vertical, horizontal or inclined position. This and other objects are accomplished by my invention, one embodiment of which is hereinafter more particularly set forth.

For a more particular description of my invention, reference is to be had to the accompanying drawings, forming a part hereof, in which—

Fig. 2 is a longitudinal section of the burner.

Fig. 3 is a longitudinal section of the drain pipe and its valves.

Figure 1:
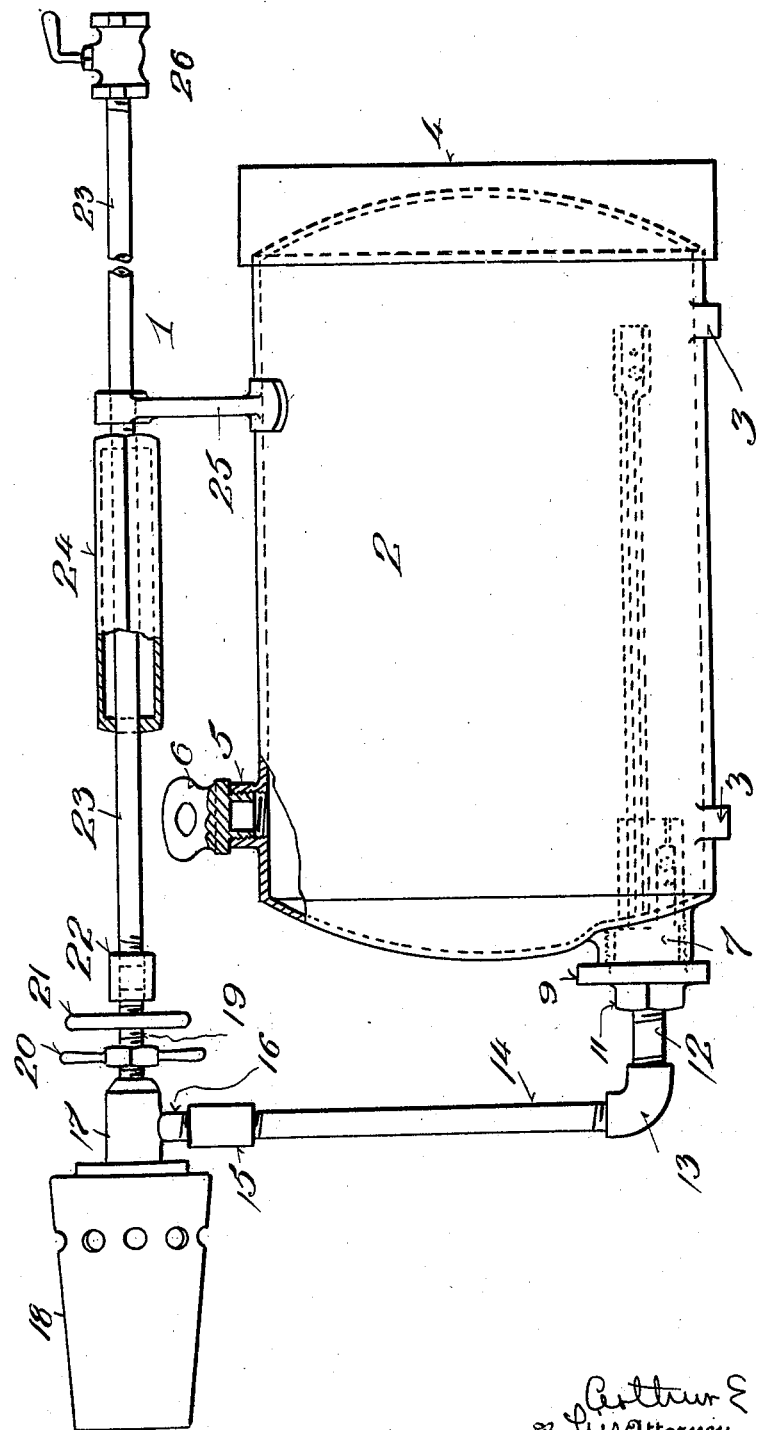
Figure 1 is a side elevation of my improved torch, a part being shown in section.

Figs. 4 and 5 are sectional views, taken on the lines 4—4 and 5—5 respectively of Fig. 3, looking in the direction of the arrows.

Throughout the various views of the drawings, similar reference characters designate similar parts.

My improved torch 1 is provided with a suitable tank 2 which may rest on feet 3 or may be stood on end and rest on a collar 4 which is shown in dotted lines. This tank may be supplied by any suitable fuel as gasolene or kerosene or whatever else is used through a nozzle 5, which is normally closed by a screw plug 6.

This tank 2 has at one side a second nozzle 7 which is closed by a hollow plug 8 which has an exterior flange 9 which holds a packing 10 against a nozzle 7 and thereby makes a tight joint and a nut 11 by which this plug may be secured in place. The interior of the nut 11 is connected to a stud pipe 12 which runs to an elbow 13 which is connected to a second pipe 14 which runs to a coupling 15 which is also connected to a branch 16 of a burner 17. This burner 17 has the usual Bunsen tube 18 which is connected in any suitable manner and a nozzle 19 which is screw threaded into this burner 17 and provided with a lock nut 20 by means of which it may be fixed. For convenience in adjusting, it is also provided with a hand wheel 21 which is secured in any suitable way or made integral therewith. This nozzle 19 is connected to a coupling 22 which is in turn connected to an air supply pipe 23 which carries a large nut 24 which is fixed thereon and may be used as a handle and this pipe 23 is supported by a bracket 25 which extends upwardly from the tank 2 and is connected to a valve 26 by means of which air may be supplied in a convenient manner.

The inner parts and connections of the plug 8 will now be described. This plug has two upwardly extending passages 27 and 28. The passage 27 has a cross bar 29 extending transversely across the same and a ball 30 confined by said bar and a seat plug 31 which is perforated and so made, arranged and disposed that when the plug 8 is vertical with the plug 31 down, the ball 30 will sit on this plug 31 and form therewith a ball valve which will be a tight valve so that no air or liquid can escape by the same.

The passage 28 is connected at its inner end to a tube 32 which is enlarged at 33 to form a seat for a ball 34 which runs in a cylindrical enlargement 35 in this tube 32 and is confined by a cross bar 36, as indicated. This ball 34 is so arranged and disposed in connection with the seat 33 that it will rest on this seat and form a ball valve whenever the tube 32 is so disposed that its inner end is substantially higher than its outer end.

In view of the foregoing, the use and advantages of my improved torch will be readily understood. Assuming the parts to be as shown in Fig. 1, and air is connected to the apparatus and fuel is in the tank. Then both balls 30 and 34 are off their seats and fuel may go through the plug 31 and tube 32 and thence through the larger plug 8 to the pipe 12 and up to the burner 17 where it is drawn by means of the action of the nozzle 19 which is supplied with air under pressure so that combined air and fuel is blown through the small opening or check of the burner 17 into the Bunsen tube 18 where combustion occurs in the conventional manner. If the torch be used with the nozzle 7 pointed downwardly, the ball 34 will sit at 33 and close the upper end of the tube 32 so that all fuel will be drawn through the plug 31 so that fuel will be fed in proper amounts to the burner 17. If the tank 2 be stood on its end as by being placed on the collar 4, the ball 30 will sit on the plug 31 and then the ball 34 will rest on the cross bar 36 and away from the seat 33 and then fuel may pass through the tube 32 and vapor or air cannot pass through the plug 31. From this it is apparent that this suction torch may be used in either a horizontal or a vertical position which would not be the case if either of the openings were above the liquid level.

While I have shown and described one embodiment of my invention, it is obvious that it is not restricted thereto, but that it is broad enough to cover all structures that come within the scope of the annexed claims.

Having thus described my invention, what I claim is:

1. In an apparatus of the class described, a suction burner, a tank and connections between the burner and tank with means therein for closing an opening above the level of the liquid so that the apparatus may be used with the tank in either a horizontal or a vertical position.

2. In an apparatus of the class described, a suction burner, a tank, a tube connecting the two and means for permitting the tube to be connected with the interior of the tank below the liquid level thereof whether the tank be held vertically or horizontally.

3. In an apparatus of the class described, a suction burner, a tank, a tube connecting the interior of the tank with the burner, a plug connected to the tube, two passages in said plug and connecting the same with the interior of the tank one of said passages terminating adjacent to the plug and the other at a distance therefrom and valves in said passages so arranged and disposed that when the tank is horizontal both passages may be open and when the tank is held with the burner end down one passage will be open and the other end closed and when the tank is held with the burner end up the passage formerly open is closed and the passage formerly closed is open.

4. In an apparatus of the class described, a tank, a suction burner, a tube connecting the burner and tank, an air pipe connected to the burner and a bracket extending upwardly from the tank and connected to the air pipe.

5. In an apparatus of the class described, a tank with a nozzle, a plug with a laterally extending flange and packing, which packing is placed between the flange and the nozzle, two passages in said plug one of which is provided with a tube with a ball valve at its free end and the other of which is provided with a ball valve, said ball valves being so arranged and disposed that when one is closed the other is open.

ARTHUR E. HAUCK.